United States Patent [19]
Mennucci

[11] Patent Number: 5,761,799
[45] Date of Patent: Jun. 9, 1998

[54] METHOD OF MAKING MULTILAYER METAL SYSTEM

[75] Inventor: Joseph P. Mennucci, Manville, R.I.

[73] Assignee: Brush Wellman Inc., Cleveland, Ohio

[21] Appl. No.: 719,388

[22] Filed: Sep. 24, 1996

Related U.S. Application Data

[62] Division of Ser. No. 564,385, Nov. 29, 1995.
[51] Int. Cl.$^6$ .................................................. H01R 43/00
[52] U.S. Cl. ........................... 29/825; 29/17.3; 29/17.6
[58] Field of Search ..................... 29/825, 17.2, 830, 29/17.6

[56] References Cited

U.S. PATENT DOCUMENTS

| | | | |
|---|---|---|---|
| 200,801 | 2/1878 | O'Neill | 29/173 X |
| 4,354,301 | 10/1982 | Takevehi et al. | 29/173 X |
| 5,301,403 | 4/1994 | Blank-Bewersdorff | 29/17.6 X |

OTHER PUBLICATIONS

Z. Metallkd, 81(2) pp. 130–135, Feb. 1990 by F. Bordeaux et al.

*Primary Examiner*—Carl J. Arbes
*Attorney, Agent, or Firm*—Hopgood, Calimafde

[57] ABSTRACT

A metal system which comprises a titanium base metal strip, at least one surface having platinum stripes thereon. As a multilayer laminate, there is provided a titanium base metal strip sandwiched between first and second copper layers. At least one surface of the first copper layer facing the titanium has platinum stripes. A method of producing the metal system and laminate, includes the step of initially cleaning bonding surfaces of a first copper strip. During a first processing phase, platinum stripes are cold roll bonded to at least one of the first copper strip surfaces. Excess material is skived from the striped copper strip, then the strip is cleaned. Upon a second process phase, bonding surfaces of the striped first copper layer, a second copper strip layer and a titanium base metal strip are cleaned. Next, the striped first copper layer is placed on the titanium base metal strip, the platinum stripes facing the titanium, and the titanium base metal strip is placed upon the second copper layer. The layers are then cold roll bonded to one another so as to form a multilayer metal system. The resulting system is cold rolled to a selected thickness, then flattened and straightened by roll leveling. The copper may be etched away leaving platinum striped titanium strip.

8 Claims, 3 Drawing Sheets

METHOD OF MAKING MULTILAYER METAL SYSTEM

This application is a division of Ser. No. 08/564,385 filed Nov. 29, 1995.

BACKGROUND OF THE INVENTION

The present invention relates to materials processing and more particularly to the production of clad strip products using surface metal coating and removal processes.

Platinum coated titanium has been found desirable for high current density anodes used to initiate and drive chemical reactions. This is due, in part, to the relatively high electrical conductivity, current density, and resistance to corrosion of both platinum and titanium. Accordingly, platinum coated titanium has also found application to ionization/oxidation systems for swimming pool filters, and in leadframes of electrical connectors.

Conventional anodes for chemical processing have been made by depositing platinum on a titanium base metal strip. The titanium base metal was covered completely with platinum. Subsequent machining was then used to remove excess platinum. While these anodes were generally effective in use, the deposition methods used to produce them were found difficult to practice and expensive. Surface contamination of the platinum and excessive chemical waste have also been issues.

SUMMARY OF THE INVENTION

In accordance with one aspect of the present invention is a product which comprises a titanium base metal strip, at least one surface of the strip having stripes of platinum thereon.

In accordance with another aspect of the present invention is a product which comprises a titanium base metal strip having first and second opposing surfaces with stripes of platinum thereon.

In accordance with a further aspect of the present invention is a product which comprises a titanium base metal strip sandwiched between first and second copper layers, at least one surface of the first copper layer facing the titanium having stripes of platinum thereon.

In accordance with still another aspect of the present invention is a product which comprises a titanium base metal strip sandwiched between first and second copper layers, at least one surface of the first and second copper layers which face the titanium having stripes of platinum thereon.

In accordance with yet another aspect of the present invention is a method of producing a multilayer metal system, which comprises the steps of: (i) cleaning bonding surfaces of a first copper strip; (ii) cold roll bonding a plurality of platinum stripes to at least one surface of the first copper strip; (iii) slitting excess material from the striped copper strip; (iv) cleaning bonding surfaces of the platinum striped first copper strip, a second copper strip, and a titanium base metal strip; (v) positioning the striped first copper strip on the titanium base metal strip such that the platinum stripes face the titanium; (vi) positioning the stripped first copper strip and titanium base metal strip on the second copper strip; (vii) cold roll bonding the striped first copper strip to the base metal strip and the second copper strip to the base metal strip to form the multilayer metal system; (viii) cold rolling the system to a selected thickness; and (ix) flattening and straightening the system by roll leveling.

In accordance with yet a further aspect of the present invention is a method of producing a multilayer metal system, which comprises the steps of: (i) cleaning bonding surfaces of first and second copper strips; (ii) cold roll bonding a plurality of platinum stripes to at least one surface each of the first and second copper strips; (iii) slitting excess material from the striped copper strips; (iv) cleaning bonding surfaces of the striped copper strips and of a titanium base metal strip; (v) positioning the first striped copper strip on the titanium base metal strip such that the platinum stripes face the titanium; (vi) positioning the titanium base metal strip on the second striped copper strip such that the platinum stripes of the second striped copper strip face the titanium; (vii) cold roll bonding the striped first copper strip to the base metal strip and the second striped copper strip to the base metal strip to form a multilayer metal system; (viii) cold rolling the system to a selected thickness; and (ix) flattening and straightening the system by roll leveling.

Although the present invention is shown and described in connection with platinum, titanium, copper and their alloys, it may be adapted for cold roll bonding of other materials such as those containing aluminum, beryllium, nickel, iron, precious metals, and their alloys.

Accordingly, it is an object of the present invention to provide a multilayer metal system having high current density for driving chemical reactions during the production of chemicals.

Another object of the present invention is to provide an environmentally acceptable, economical product for the wood pulp processing and paper industries.

Still another objective is to eliminate contamination of platinum in a platinum-titanium laminate used in chemical processing.

A further object of the present invention is to prevent multilayer laminates from bonding to the work surfaces of rolls during their processing.

Yet another object of the present invention is to facilitate low cost production of noncorrosive, high performance materials.

Still a further object of the present invention is to substantially reduce chemical waste during metal-to-metal bonding.

Another object of the present invention is to maximize bonding of layers in a multilayer laminate during cold rolling.

Yet a further object of the present invention is to improve anodes for electrolytic systems.

Still another object of the present invention is to reduce surface area of platinum on a titanium base material to allow for increased current densities required for chemical reaction.

The present invention will now be further described by reference to the following drawings which are not intended to limit the accompanying claims.

BRIEF DESCRIPTION OF THE DRAWINGS

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

It has been discovered that the incorporation of a surface material, e.g., a copper alloy, as a parting layer between platinum-titanium strip and roll work surfaces lessens the percent (%) surface area and quantity of platinum required. This, in turn, allows stripes or other patterns of platinum to be selectively clad to the titanium, making it possible to produce a product of substantial commercial desirability.

Platinum striped titanium is produced readily and economically with minimal contamination of the platinum. It is also notable for its relatively high conductivity, resistance to corrosion, and current density as well as its environmental acceptability. For these reasons, titanium with platinum stripes is advantageous for anodes used to initiate chemical reactions, particularly those for the production of paper. Other applications include anodes for oxidation/ion purification systems and leadframes of electrical connectors.

Figure 1:
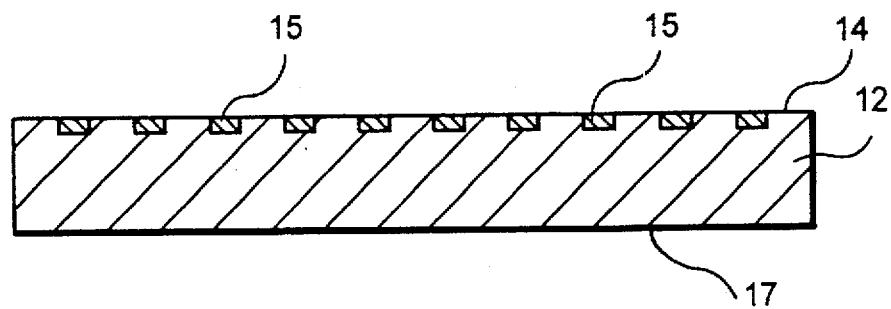
FIG. 1 is a copper alloy selectively coated with platinum stripes in accordance with one step of the present invention.
Figure 2:
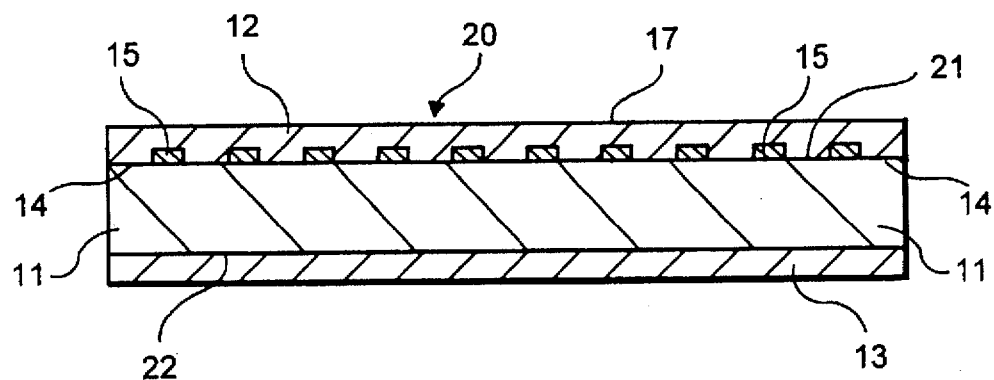
FIG. 2 shows a titanium base metal strip clad between first and second copper alloy layers, the first alloy layer being selectively coated with platinum stripes in accordance with another step of the present invention.
Figure 3:
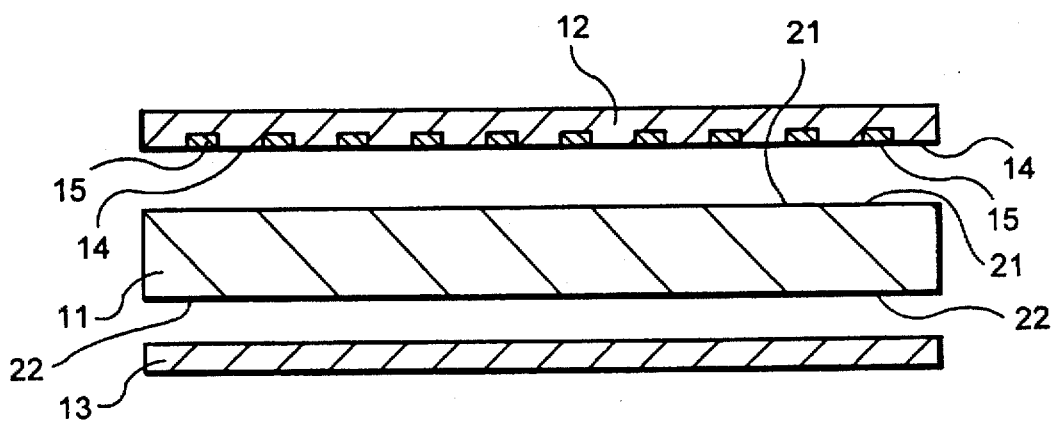
FIG. 3 is an exploded view of the clad strip of FIG. 2.
Figure 4:
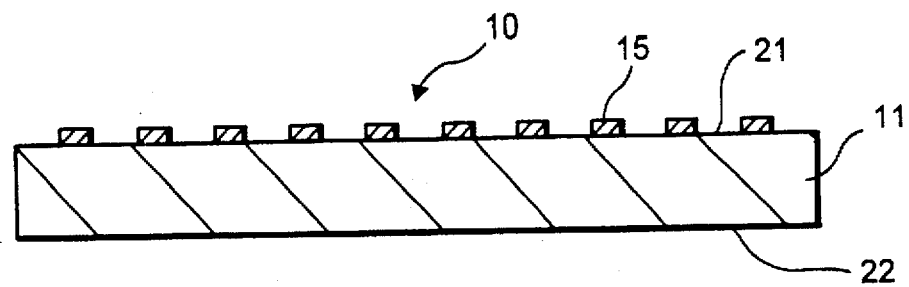
FIG. 4 is an illustrative titanium base metal strip product selectively coated with platinum stripes, according to the present invention.

Referring now to the drawings and more particularly to FIGS. 1–8, there is shown generally a multilayer metal system or product, in accordance with various aspects of the present invention. In accordance with one aspect of the present invention, as set forth in FIG. 4, is a product 10 which comprises a titanium base metal strip 16, at least one surface 14 of the strip having stripes of platinum 15 thereon. In accordance with another aspect of the present invention is a multilayer metal system or product 20, as shown in FIGS. 2 and 3, which comprises a titanium base metal strip 11 sandwiched between first and second copper layers or strips 12 and 13, respectively. A bonding surface 14 of the first copper layer facing the titanium has stripes of platinum 15 thereon. The parting or first copper layer 12, e.g., at least one copper alloy, serves generally as a surface material for selectively cladding the platinum stripes to the titanium strip.

In production of products 10, 20, first copper layer or strip 12, e.g., copper with 200 ppm oxygen such as Alloy C11000, is processed initially in coil form from a selected starting size, e.g., about 0.040 in. thick and 4.750 in. wide (annealed temper). Both sides 14, 17 of the strip are cleaned for bonding by wire brushing, e.g., using rotating metal brushes.

During a first phase of production, platinum, e.g., 99.999% pure (supplied by Williams Advanced Materials, Inc.), is cold roll bonded in stripe form, e.g., 0.08 in. wide, to at least one of the first copper strip surfaces.

More particularly, a polyvinyl chloride machine plate with a stainless steel roller passes across the copper strip and bonds multiple strands of platinum, e.g., 8 or more, to the strip. This unites the platinum strands or stripes 15 with copper strip 12 in a mechanical or pressure bond at room temperature, as best seen in FIG. 1. High density polyethylene is used in the roller shaft at 0.184 lbs/ft. to provide relatively low friction.

Excess material is trimmed or slit from the resulting striped copper strip, to a selected width, e.g., 4.500±0.005, using rotating blades such as a rotary knife slitter. The strip is then cleaned by wet oscillating brushes, as understood by those skilled in the art.

Upon a second process phase, two coils, e.g., ¼ and ¾ in., of the platinum striped side 14 of the striped first copper strip 12 (otherwise known as the platinum-copper subassembly) are again cleaned at their bonding surfaces 14, 17 by wet oscillating brushes. Both sides 21 and 22 of titanium base metal strip 11 are cleaned in the same manner, as is one coil of second copper layer or strip 13, e.g., Alloy C11000.

Figure 5:
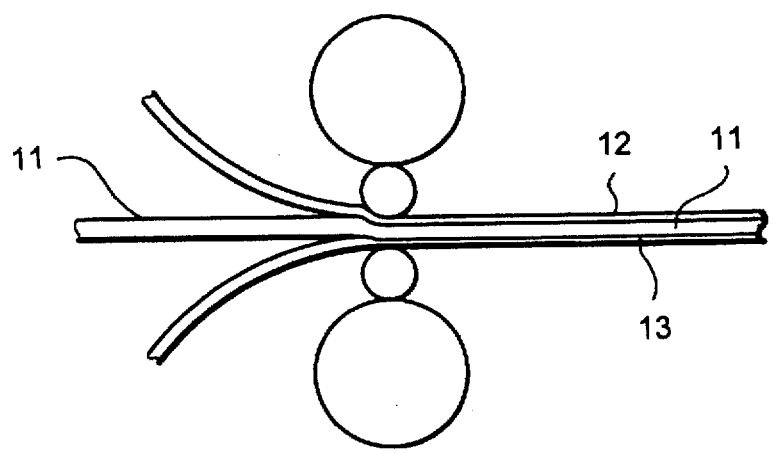
FIG. 5 is a schematic view of a cladding step used to form a copper alloy clad titanium base metal strip, in accordance with one aspect of the present invention.
Figure 5A:
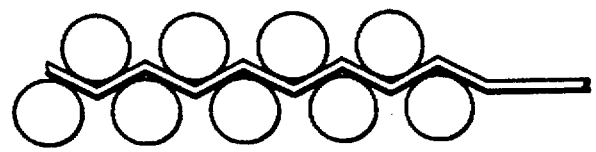
FIG. 5A is a schematic view of a roll leveling step used to form the base metal strip of FIG. 5.

The striped first copper strip is placed on the titanium base metal strip, with the platinum stripes facing the titanium, and the titanium base metal strip is placed upon the second copper strip. As shown in FIG. 5, the copper strips are then clad to the base metal strip by cold roll bonding in order to form multilayer metal system 20.

The resulting system is subsequently cold rolled to a selected thickness, e.g., 0.040 in.±0.0015, then flattened and straightened by roll leveling, such as a power flattener line illustrated in FIG. 5. Alternatively or concurrently therewith, upon etching system 20, e.g., in a conventional acid bath, the copper alloy layers are removed, leaving platinum striped titanium strip product 10 shown in FIG. 4.

Figure 6:
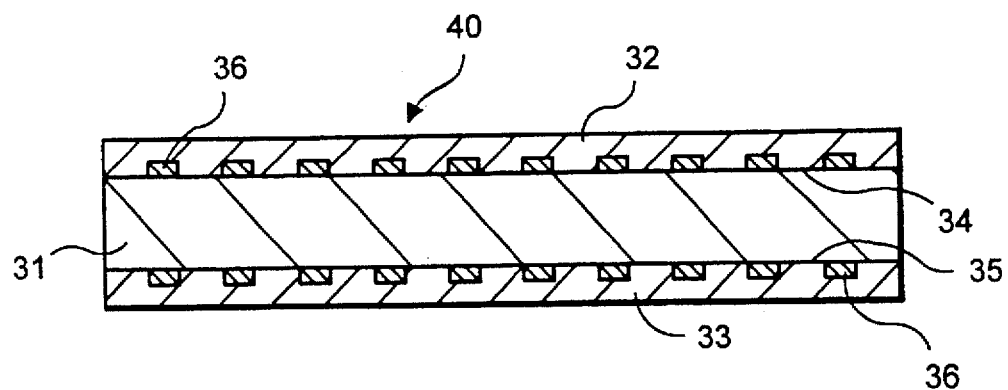
FIG. 6 is a titanium base metal strip clad between first and second copper alloy layers, each alloy layer being selectively coated on both sides with platinum stripes, in accordance with another step of the present invention.
Figure 7:
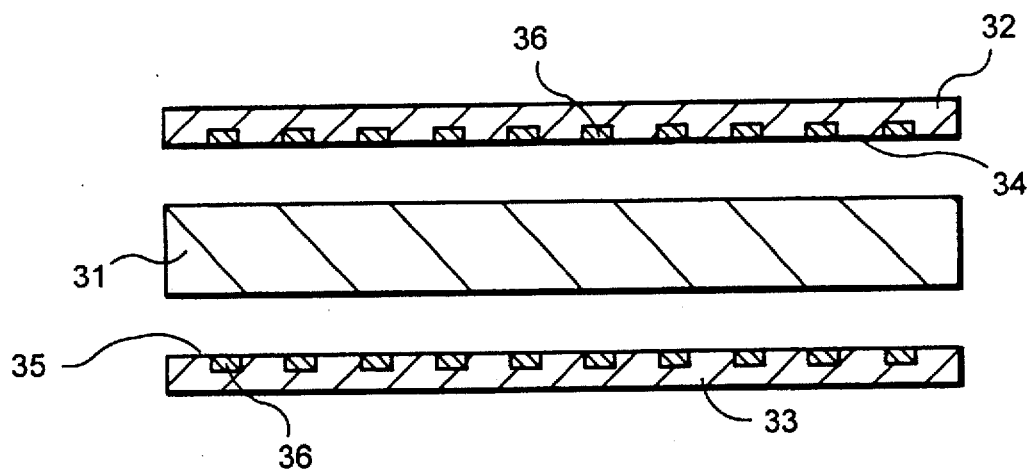
FIG. 7 is an exploded view of the clad strip of FIG. 6.
Figure 8:
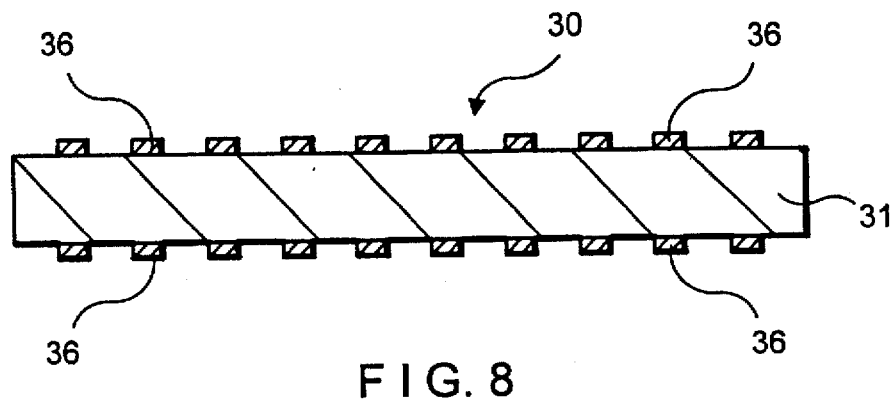
FIG. 8 is an illustrative titanium base metal strip product selectively coated with platinum stripes on both sides, according to another aspect of the present invention.

In accordance with a further aspect of the invention, as set forth in FIG. 8, is a product 30 which comprises a titanium base metal strip 31 having first and second opposing surfaces 34, 35 with stripes of platinum 36 thereon. Alternatively, as shown in FIGS. 6 and 7, is a multilayer metal system or product 40 which comprises a titanium base metal strip 31 sandwiched between first and second copper layers or strips 32 and 33, respectively. Bonding surfaces 34, 35 of the first and second copper layers, respectively, facing the titanium have stripes of platinum 36 thereon.

In this embodiment, first copper strip 32 is initially processed in coil form from a selected starting size, e.g., about 0.125 in. thick and 4.000 in. wide (annealed temper). Both sides, i.e., bonding surfaces 34, 35, each of the first and second copper strips, respectively, are cleaned for bonding by wire brushing, e.g., using rotating metal brushes.

During the first phase of processing, the platinum is cold roll bonded in stripe form, e.g., 0.08 in. wide, to at least one surface 34, 35 each of the first and second copper strips. Next, excess material is trimmed or slit from the platinum striped copper strips to a selected width, e.g., 4.000 in., using rotating blades, such as a rotary knife slitter. Each strip is then cleaned using wet oscillating brushes, as will be appreciated by those skilled in the art.

Upon the second process phase, two coils, e.g., ¼ and ¾ in., of the platinum striped side of each of the first and second copper strips (or platinum-copper subassemblies) are again cleaned by wet oscillating brushes, at bonding surfaces 34, 35. Both sides of titanium base metal strip 31 are cleaned in the same manner, as are bonding surfaces 34, 35 of one coil of the second copper strip, e.g., C11000.

Next, the first striped copper strip is placed on the titanium base metal strip and the titanium base metal strip on the second striped copper strip such that the platinum stripes of the first and second copper strips are facing the titanium.

As shown in FIG. 4, the strips are then clad to one another, e.g., by cold roll bonding, so as to form multilayer metal system 30, e.g., 0.074 to 0.076 in. thick. The resulting system is cold rolled to a selected thickness, e.g., 0.0675 in.±0.0015, then flattened and straightened by roll leveling, such as a power flattener line, e.g., cut to 37 in. or ½ in. lengths.

The copper layers may then be etched away, e.g., by conventional methods, leaving platinum striped titanium strip product 30. Etching may be performed by the manufacturer or by the customer, as will be understood by those skilled in the art.

By the present invention, pure (unoxidized) platinum is exposed during cold rolling which interlocks with the corresponding rough exposed pure titanium, forming a sound mechanical bond therebetween. Initially, contamination of the platinum, such as oxidation, is believed minimal. During use, contaminated portions erode, causing the material's performance to increase with age.

This results in a product of superior bond integrity which continually prevents interdiffusion between the platinum and titanium which may contaminate the platinum surface. Such contamination usually requires etching or further surface treatment for removal.

The reduced surface area of platinum allows for increased current densities required to initiate and drive chemical reactions. The present invention also eliminates cold roll bonding of platinum to the roll work surfaces.

This provides cost-effective mass production of high performance anodes used in chemical processing, leadframes for electrical connectors, and other suitable applications.

Although the embodiments illustrated herein have been described for use with copper or a copper alloy, it is understood that an analogous process could be practiced on other materials, giving consideration to the purpose for which the present invention is intended. For example, similar processing of materials containing precious metals and their alloys, aluminum, titanium, nickel, steel, carbon and ceramics is considered within the spirit and scope of the present invention. It is also foreseeable that an intermediate bonding layer such as nickel, titanium or silver could be added between the copper layers to modify properties of the laminate materials.

Various modifications and alterations to the present invention may be appreciated based on a review of this disclosure. These changes and additions are intended to be within the scope and spirit of this invention as defined by the following claims.

What is claimed is:

1. A method of producing a multilayer metal system, which comprises the steps of:

(i) cleaning bonding surfaces of a first copper strip;

(ii) cold roll bonding a plurality of platinum stripes to at least one surface of the first copper strip;

(iii) slitting excess material from the striped copper strip;

(iv) cleaning bonding surfaces of the platinum striped first copper strip, a second copper strip, and a titanium base metal strip;

(v) positioning the striped first copper strip on the titanium base metal strip such that the platinum stripes face the titanium;

(vi) positioning the striped first copper strip and titanium base metal strip on the second copper strip;

(vii) cold roll bonding the striped first copper strip to the base metal strip and the second copper strip to the base metal strip to form the multilayer metal system;

(viii) cold rolling the system to a selected thickness; and (ix) flattening and straightening the system by roll leveling.

2. The method met forth in claim 1 wherein the copper layers comprise C11000.

3. The method set forth in claim 1 wherein the platinum comprises pure 99.999% platinum.

4. The method set forth in claim 1 wherein the first and second copper strips are etched away after step (x), leaving a platinum striped titanium base metal strip.

5. A method of producing a multilayer metal system, which comprises the steps of:

(i) cleaning bonding surfaces of first and second copper strips;

(ii) cold roll bonding a plurality of platinum stripes to at least one surface each of the first and second copper strips;

(iii) slitting excess material from the striped copper strips;

(iv) cleaning bonding surfaces of the striped copper strips and of a titanium base metal strip;

(v) positioning the first striped copper strip on the titanium base metal strip such that the platinum stripes face the titanium (vi) positioning the titanium base metal strip on the second striped copper strip such that the platinum stripes of the second striped copper strip face the titanium;

(vii) cold roll bonding the first striped copper strip to the base metal strip and the second striped copper strip to the base metal strip to form a multilayer metal system;

(viii) cold rolling the system to a selected thickness; and (ix) flattening and straightening the system by roll leveling.

6. The method set forth in claim 5 wherein the copper layers comprise C11000.

7. The method set forth in claim 5 wherein the platinum comprises pure 99.999% platinum.

8. The method set forth in claim 5 wherein the first and second copper strips are etched away after step (ix), leaving a platinum striped titanium base metal strip.

* * * * *